UNITED STATES PATENT OFFICE.

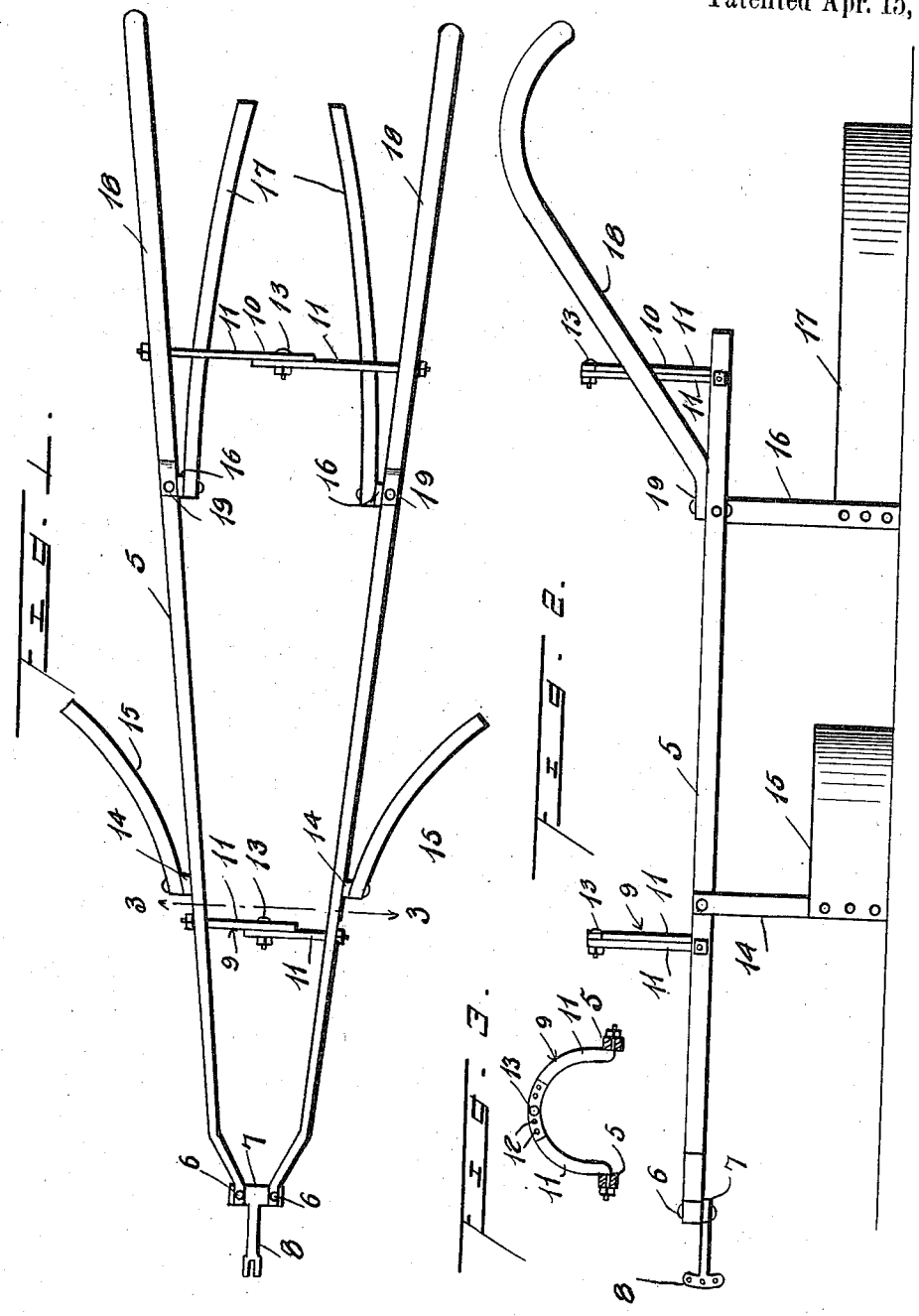

WILLIAM HENRY FRASHIER, OF ATHELSTAN, ARKANSAS.

CULTIVATOR.

1,300,596.  Specification of Letters Patent.  Patented Apr. 15, 1919.

Application filed June 19, 1918. Serial No. 240,750.

*To all whom it may concern:*

Be it known that I, WILLIAM HENRY FRASHIER, a citizen of the United States, residing at Athelstan, in the county of Mississippi and State of Arkansas, have invented certain new and useful Improvements in Cultivators; and I do hereby declare the following to be a full, clear, and exact description of the invention, such as will enable others skilled in the art to which it appertains to make and use the same.

This invention is an improvement in agricultural machines, and has particular reference to a cultivator.

An object of the invention is to provide an improved straddle row cultivator employed for cultivating cotton and corn plants, and adapted to operate upon both the straddled row and the next adjacent row on each side thereof.

Another object is the provision of a cultivator of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a top plan view of the cultivator constructed in accordance with the invention, Fig. 2 is a side elevation thereof, and Fig. 3 is a transverse section on the line 3—3 of Fig. 1.

Referring more particularly to the accompanying drawing, in which like reference characters indicate similar parts, the cultivator is shown as comprising a pair of rearwardly diverging side beams 5, each of which has its forward end pivoted at 6 to a transverse horizontal plate 7, formed upon the rear end of the clevis 8 to which a draft device (not shown) is adapted to be connected, whereby the cultivator may be drawn by an animal. The forward ends of the side beams 5 are pivoted to the plate 7 to permit of an adjustment of the beams toward and away from each other to vary the distance therebetween, and in order that said beams may be maintained in adjusted positions with respect to each other the same are connected by front and rear arched members 9 and 10, preferably consisting of sections 11, having their outer ends secured to the side beams and their inner ends disposed in overlapping relation and provided with a plurality of apertures 12, certain of which are registered to receive the fastening bolt 13. In this manner it will be apparent that the side beams 5 may be spread apart or adjusted toward each other by removing the bolts 13 and then replacing the same in the openings 12, which are registered after the adjustments.

Depending from the side beams 5, adjacent their forward ends and just rearwardly of the arched member 9, are the opposed and vertically arranged supporting arms 14, to the lower end of each of which there is secured in any preferred manner a covering blade 15 of arcuate or curved formation longitudinally throughout its entire length, and disposed rearwardly and outwardly with respect to the adjacent side beams with the convex surface of the blade arranged adjacent said beam. It will be obvious that as the machine travels over a straddled row of plants the blades 15 will throw the dirt or soil on either side of said row upon the next adjacent rows, and thus effectively cover the lower portions of the plants.

In order that the plants of the straddled row may be likewise covered, there is preferably provided another pair of depending supporting arms 16, the upper ends of which are secured to the side beams 5 adjacent the rear ends thereof, while the lower ends of the arms have secured thereto in any preferred manner the covering blades 17, which are of slightly greater length and less depth than the blades 15, and also of arcuate formation. The blades 17 are disposed between the side beams 5 with the convex surfaces arranged adjacent thereto, and said blades 17 are disposed in rearwardly converging relation with respect to each other, so that the same will effectively operate to gather the soil on either side of the straddled row and force the same inwardly toward the plants of said row. The cultivator further comprises a pair of handles 18, having their forward ends secured to the side beams 5, as at 19, forwardly of the rear ends of said beams, and said handles are arranged in upwardly inclined positions so as to be within easy reach of the operator.

What is claimed is:

A cultivator of the class described comprising side beams adjustable toward and away from each other to vary the distance therebetween, means for maintaining said beams in adjusted positions, supporting arms depending from said beams adjacent the forward ends, covering blades secured to the lower ends of said arms and of arcuate formation, said blades diverging rearwardly and outwardly from the side beams, other supporting arms depending from the side beams adjacent the rear ends thereof, and covering blades secured to the lower ends of the last-named arms, said blades being of arcuate formation and disposed between said side beams and arranged in rearwardly converging relation with relation to each other and diverging relation with respect to the side beams.

In testimony whereof I affix my signature in presence of two witnesses.

WILLIAM HENRY FRASHIER.

Witnesses:
 JNO. H. HARKINS,
 S. A. REYNOLDS.